(12) United States Patent
Krishnamurthy et al.

(10) Patent No.: US 11,271,509 B2
(45) Date of Patent: *Mar. 8, 2022

(54) LOW-NOISE, HIGH ROTOR POLE SWITCHED RELUCTANCE MOTOR

(71) Applicant: Software Motor Corporation, Sunnyvale, CA (US)

(72) Inventors: Mahesh Krishnamurthy, Wheaton, IL (US); Trevor Creary, San Jose, CA (US); Piyush Desai, Des Plaines, IL (US); Mark Johnston, Los Altos Hills, CA (US)

(73) Assignee: Turntide Technologies Inc., Sunnyvale, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/920,727

(22) Filed: Jul. 5, 2020

(65) Prior Publication Data

US 2020/0366231 A1 Nov. 19, 2020

Related U.S. Application Data

(63) Continuation of application No. 16/461,483, filed on May 16, 2019, now Pat. No. 10,707,798.

(51) Int. Cl.
*H02P 25/098* (2016.01)
*H02K 37/04* (2006.01)

(52) U.S. Cl.
CPC ........... *H02P 25/098* (2016.02); *H02K 37/04* (2013.01); *H02K 2213/03* (2013.01)

(58) Field of Classification Search
CPC ... H02P 25/098; H02K 37/04; H02K 2213/03
See application file for complete search history.

(56) References Cited

U.S. PATENT DOCUMENTS 4,520,302 A * 5/1985 Hill .................... H02P 8/12
318/685
8,058,824 B2 * 11/2011 Williams ............... B62D 5/046
318/265

(Continued)

FOREIGN PATENT DOCUMENTS

CN 105940596 A 9/2016
EP 0348984 A1 1/1990

(Continued)

OTHER PUBLICATIONS

Heinz, Senkel, Communication pursuant to Rule 114(2) EPC, European Patent Office re Patent Application 17931825.8, dated Feb. 2, 2021, Munich, Germany.

*Primary Examiner* — Rina I Duda
(74) *Attorney, Agent, or Firm* — Temmerman Law; Mathew J. Temmerman

(57) ABSTRACT

The present embodiment is a high rotor pole switched reluctance machine (HRSRM) which provides a plurality of combinations of the number of rotor poles $R_n$ and number of stator poles $S_n$ utilizing a numerical relationship defined by a mathematical formula, $R_n=2S_n-F_p$, when $S_n=m\times F_p$, wherein $F_p$ is the maximum number of independent flux paths in the stator when stator and rotor poles are fully aligned, and m is the number of phases. The mathematical formulation provides an improved noise performance and design flexibility to the machine. The mathematical formulation further provides a specific number of stator and rotor poles for a chosen m and Fp. The HRSRM can be designed with varying number of phases. The HRSRM provides a smoother torque profile due to a high number of strokes per revolution.

27 Claims, 9 Drawing Sheets

(56) References Cited

U.S. PATENT DOCUMENTS

| | | | | |
|---|---|---|---|---|
| 2008/0315896 A1* | 12/2008 | Fahimi | ................... | G01R 31/34 |
| | | | | 324/603 |
| 2015/0171674 A1* | 6/2015 | Lee | ....................... | H02K 1/276 |
| | | | | 318/724 |
| 2016/0036366 A1* | 2/2016 | Yang | ................... | H02K 19/103 |
| | | | | 318/701 |

FOREIGN PATENT DOCUMENTS

| | | |
|---|---|---|
| JP | S60-125148 A | 7/1985 |
| JP | 4922600 | 6/2007 |
| WO | 2004084375 A3 | 9/2004 |
| WO | 2015038197 A1 | 3/2015 |
| WO | 2016183671 A1 | 11/2016 |
| WO | 2016183673 A1 | 11/2016 |

\* cited by examiner

LOW-NOISE, HIGH ROTOR POLE
SWITCHED RELUCTANCE MOTOR

RELATED APPLICATIONS

This application is a continuation application based on U.S. patent application Ser. No. 16/461,483, filed May 16, 2019 and granted as U.S. Pat. No. 10,707,798 on Jul. 7, 2020, and which is a 35 U.S.C. 371 national phase application claiming priority to the International Application PCT/US2017/068829, filed Dec. 28, 2017.

BACKGROUND OF THE DISCLOSURE

Technical Field of the Disclosure

The present disclosure relates in general to high rotor pole switched reluctance machines (HRSRM), and more particularly to a system and method for providing a plurality of combinations of rotor poles and stator poles thereby reducing noise and vibration in the switched reluctance motor drives.

Description of the Related Art

Recent advances in electromagnetic simulation capabilities and power electronics have made switched reluctance motor (SRM) an attractive candidate for electric motor applications. Positive aspects of SRM drives include their inherent variable speed capability over a wider operating range, simple construction, robust performance, and low manufacturing cost. An SRM is a brushless, synchronous machine having salient rotor and stator poles. There is a concentrated winding on each of the stator poles, but no windings or permanent magnets on the rotor. The SRM can have several combinations of stator poles and rotor poles, where the rotor typically has fewer poles than the stator. The pairs of diametrically opposite stator pole windings are connected in series or in parallel to form an independent machine phase winding of the multi-phase SRM. Ideally, the flux entering the rotor from one stator pole balances the flux leaving the rotor from the diametrically opposite stator pole, so that there is no mutual magnetic coupling among the phases. Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position, thereby preventing the magnetic force of attraction from producing a negative or braking torque. Hence, by properly energizing the phase windings relative to rotor angle, forward or reverse operation and motoring or generating operation can be obtained.

Compared to a conventional SRM, the HRSRM has higher static torque capability, which effectively addresses torque ripple and acoustic noise. The design parameters of the power converters of SRMs and HRSRMs differ. This is because the HRSRM has a different inductance profile and a higher number of strokes. Most reliable techniques for the conventional HRSRM utilize the self-inductance of the phase coil to estimate position. The HRSRM has a higher number of rotor poles for the same circumference as a conventional SRM. The higher number of rotor poles reduces the angular travel per excitation. However, the larger number of rotor poles lead to a smaller gap and the arc length (or angular length) between two rotor poles is smaller. As a result, the self-inductance profile for the HRSRM becomes flatter which leads to unreliable position estimation.

Another conventional approach describes a switched reluctance machine; whether operated as a motor, generator, or both; having a new relationship between the number of stator poles and rotor poles so as to provide a SRM with a minimal amount of torque ripple and acoustic noise while providing improved power density and torque production. This invention provides a SRM having a salient rotor and stator pole numerical relationship of S number of stator poles, where S>2, and R number of rotor poles, which can be expressed as R=2S−2, such as an S/R pole count in a 6/10, 8/14, or 10/18 configuration. Also, while the invention is described in relation to an exemplary form of rotary machines, it is equally applicable to other forms of rotary machines and to linear and inverted machines as well. Though, the approach describes one specific formula, which describes only one possible number for rotor poles for a given number of stator poles. As an example, 16 stator poles would lead to 30 rotor poles.

Another approach describes an SRM that supports one or more phases, each phase comprising a stator, a rotor and coils. The stator is hollow, cylindrical and comprises stator poles extending inwards, such that a recess is formed between adjacent stator poles. The coils are wound on the stator poles and occupy the recess. The rotor is positioned inside the stator and has poles extending outwards. The rotor and stator poles subtend an angle having a maximum value of 0.5 electrical pole pitches at a center of rotation. The different phases are distributed along the axis of the SRM. The rotor is rotated by a reluctance torque generated by energizing a phase in a current controlled manner until the rotor rotates through a minimum commutation angle required to maintain motion; de-energizing the phase by freewheeling it by using the energy stored in it and simultaneously energizing a second sequentially adjacent phase. This conventional approach only duplicates combinations of rotor and stator and does not present any relation between the magnetic circuit (flux path) and the number of stator or rotor poles in the machine.

Yet another approach describes a two-phase switched reluctance machine, the machine using discontinuous core structures as the stator for effective use as part of low-cost, high-performance drives. This discontinuous stator core structure contains short flux paths and maximum overlap between the rotor poles and stator poles in the stator discontinuous core structures, regardless of the rotor position. Example configurations of such core structure include E-core, L-core and I-core configurations. Using less steel and magnet wire than in conventional SRM designs results in cost savings of stator material and winding material. Efficiency of this novel SRM is improved because of shorter flux paths resulting in reduction of core losses and decreased phase resistance resulting in reduction of copper losses. Two-phase simultaneous excitation of the novel SRM can reduce torque ripple during commutation as compared with existing two-phase SRMs. This conventional approach introduces one more geometric shape for the HRSRM with reduced stator, however, it does not show any electromagnetic relation that can be used to predict different configurations.

Therefore, there is a need for a high rotor pole switched reluctance machine (HRSRM) comprising a higher number of rotor poles than stator poles and which would be capable of addressing the issues of high torque ripple and acoustic noise. Such a switched reluctance machine would enable a minimal amount of torque ripple and would further enhance torque quality of the machine. Such an HRSRM would provide a plurality of combinations of the rotor poles and stator poles utilizing a numerical relationship defined by a specific mathematical formula. Such a machine would facilitate improved noise performance and design flexibility. The present embodiment overcomes the aforementioned shortcomings in this area by accomplishing these critical objectives.

SUMMARY OF THE DISCLOSURE

To minimize the limitations found in the prior art, and to minimize other limitations that will be apparent upon the reading of this specification, the present invention is a high rotor pole switched reluctance machine (HRSRM) comprising a stator including a plurality of stator poles and a rotor including a plurality of rotor poles, and which provides a plurality of combinations of the rotor poles and stator poles utilizing a numerical relationship defined by a mathematical formula:

$$R_n = 2S_n - F_p;$$

such that $S_n = m \times F_p$, $F_p > 2$, $m > 1$ and m and $F_p$ are independent variables wherein $R_n$ is the number of rotor poles, $S_n$ is the number of stator poles, $F_p$ is the maximum number of independent flux paths in the stator when stator and rotor poles are fully aligned, and m is the number of phases.

The present invention relates to a switched reluctance machine (SRM) in which noise and vibration generated can be reduced through an improvement of the rotor pole/stator pole configuration. The improved configuration provides a higher rate of change of inductance with respect to rotor position, which can improve the torque quality of the machine. The proposed formulation presents a mathematical formulation, with a specific number of stator and rotor poles for a chosen m and $F_p$, which provides improved noise performance and design flexibility. In one example, when m=4, a machine with four phases and $F_p=4$, which represents a machine with four possible independent flux paths, resulting in a 16/28 SRM. The embodiment of this formulation may be described by several other viable combinations of stator poles and rotor poles. Utilizing the proposed formulation, it is possible to design machines with varying number of phases and stator/rotor configurations. The present invention provides an SRM with applications for both rotary or linear designs, and which comprises a relationship between the number of stator poles and rotor poles so as to provide an SRM with a minimal amount of torque ripple and acoustic noise while providing improved power density and torque production. In particular, the present invention provides an SRM having a salient rotor and stator pole numerical relationship of Sn number of stator poles, and Rn number of rotor poles, which can be expressed as Rn=2Sn−Fp, such as a machine with a Sn/Rn pole count in a 16/28 configuration. The present invention provides an SRM, whether operated as a motor, generator, or both. The proposed topologies have the highest inductance when aligned and the lowest at unaligned positions, much like a conventional SRM. All conventional power electronic converters and control strategies adopted for conventional SRMs may be applied to the proposed SRM. The proposed SRM exhibits a smoother torque profile due to the higher number of strokes per revolution. This offers better peak and average torque profiles relative to conventional SRMs.

A first objective of the present invention is to provide an HRSRM with reduced noise properties and vibration levels generated from the machine during operation.

A second objective of the present invention is to provide an HRSRM with minimal amount of torque ripple and enhanced torque quality of the machine as compared to conventional SRMs and HRSRMs.

A third objective of the present invention is to provide an HRSRM with high power density and torque.

A fourth objective of the present invention is to provide an HRSRM with varying number of phases.

A fifth objective of the present invention is to provide an HRSRM with a plurality of combinations of the rotor poles and stator poles utilizing a numerical relationship defined by a mathematical formula.

A sixth objective of the present invention is to provide an HRSRM exhibiting high reliability and efficiency, thereby reducing the consumer cost of such motors.

A seventh objective of the present invention is to present a mathematical design formulation that takes into account independent flux paths in an HRSRM.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. Thus, the drawings are generalized in form in the interest of clarity and conciseness.

The foregoing aspects and many of the attendant advantages of the invention will become more readily appreciated as the same becomes better understood by reference to the following detailed description, when taken in conjunction with the attached charts and figures, wherein.

DETAILED DESCRIPTION OF THE PREFERRED EMBODIMENT

In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one or more of the problems discussed above. Further, one or more of the problems discussed above may not be fully addressed by any of the features described below. The invention will now be described with reference to the accompanying drawing which does not limit the scope and the ambit of the invention. In the following discussion that addresses a number of embodiments and applications of the present invention, reference is made to the accompanying drawings that form a part hereof, and in which is shown by way of illustrating specific embodiments in which the invention may be practiced. It is to be understood that other embodiments may be utilized and changes may be made without departing from the scope of the present invention.

The present invention provides a plurality of combinations of the rotor poles and stator poles utilizing a numerical relationship defined by a mathematical formula:

$$R_n = 2S_n - F_p;$$

Where $S_n = m \times F_p$, $F_p > 2$, $m > 1$ and m and $F_p$ are independent variables, $R_n$ is the number of rotor poles, $S_n$ is the number of stator poles, $F_p$ represents the maximum number of independent flux paths in the stator when stator and rotor poles are fully aligned AND $F_p > 2$, m is the number of phases AND $m > 1$ and m and $F_p$ are independent variables.

Figure 1:
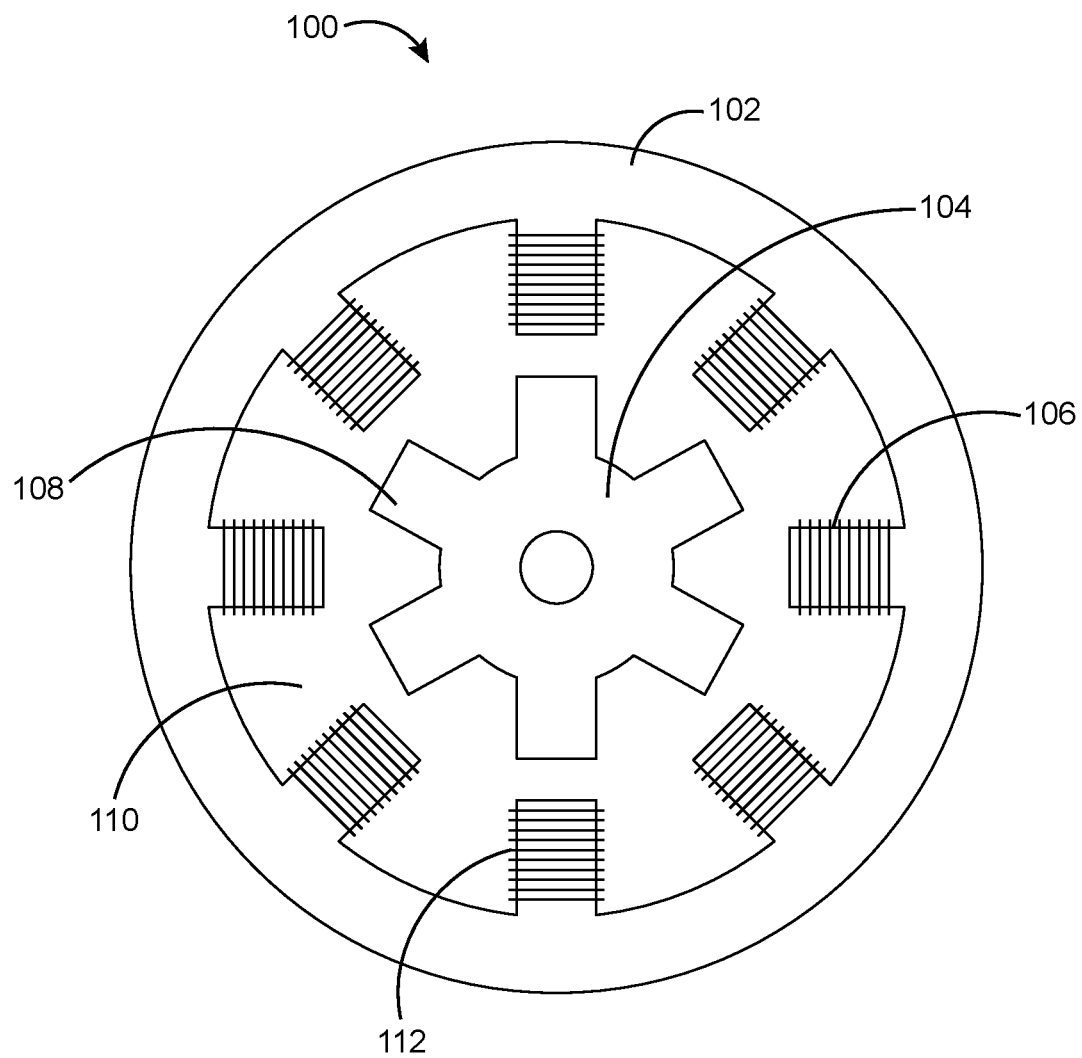
FIG. 1 illustrates a cross-sectional view of a switched reluctance motor.

Turning first to FIG. 1, a cross-sectional view of a switched reluctance motor 100 is illustrated. The switched reluctance motor 100 includes a stator 102 and a rotor 104 that rotates inside the stator 102. The stator 102 includes a plurality of stator poles 106 and the rotor 104 includes a plurality of rotor poles 108. As the rotor 104 rotates, an airgap 110 separates stator poles 106 from rotor poles 108. The switched reluctance motor 100 shown in FIG. 1 is referred to as an 8/6 SRM since stator 102 includes eight stator poles 106 and rotor 104 includes six rotor poles 108. Other viable combinations of the stator poles and rotor poles of the switched reluctance motor 100, and may benefit from the teachings of the invention. A winding 112, for example a copper winding, is wound around each stator pole 16. The windings 112 on diametrically opposite pairs of the stator poles 106 are connected in series or in parallel. Phase currents are sent through the windings 112 on pairs of stator poles 106 connected in series or in parallel, and are turned on and off based on the angular position of the rotor 104 with respect to the stator 102.

Electromagnetic torque is produced in switched reluctance motor 100 by the attraction of rotor pole(s) 108 to the excited stator pole(s) 106. For example, exciting the stator poles 106 by turning on a current through the windings 112 on stator poles 106 creates an electromagnetic force density in air gaps 110. Due to a tangential component of this electromagnetic force density, a rotor pole 108 near stator pole 106 is attracted to the stator pole 106. Likewise, the diametrically opposite rotor pole 108 near the stator pole 106 is attracted to, and attempts to align itself with, the stator pole 106. Thus, an electromagnetic torque force is produced, turning the rotor 104 counter-clockwise.

Figure 2:
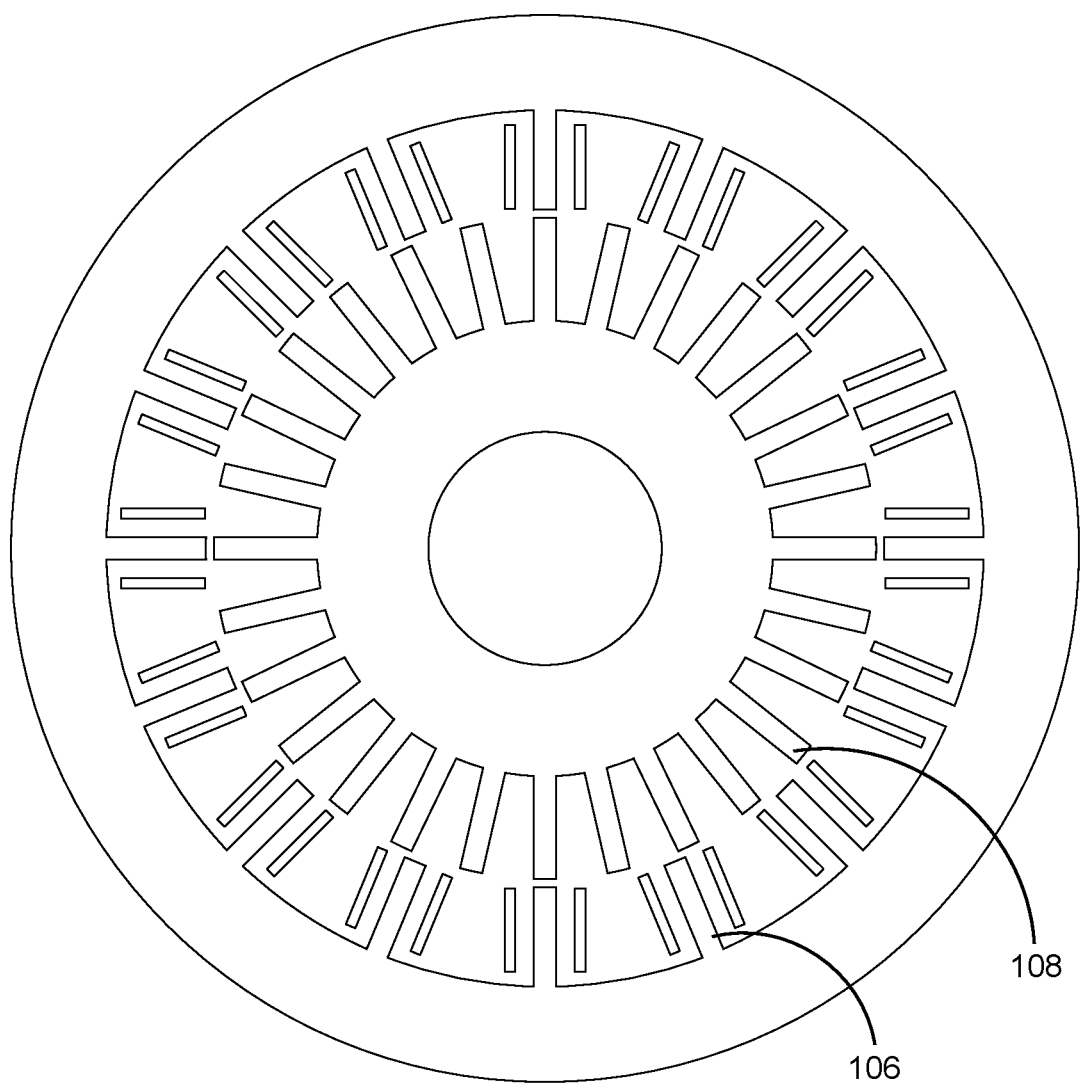
FIG. 2 illustrates a 16/28 SRM as an example of the proposed formulation.
Figure 3:
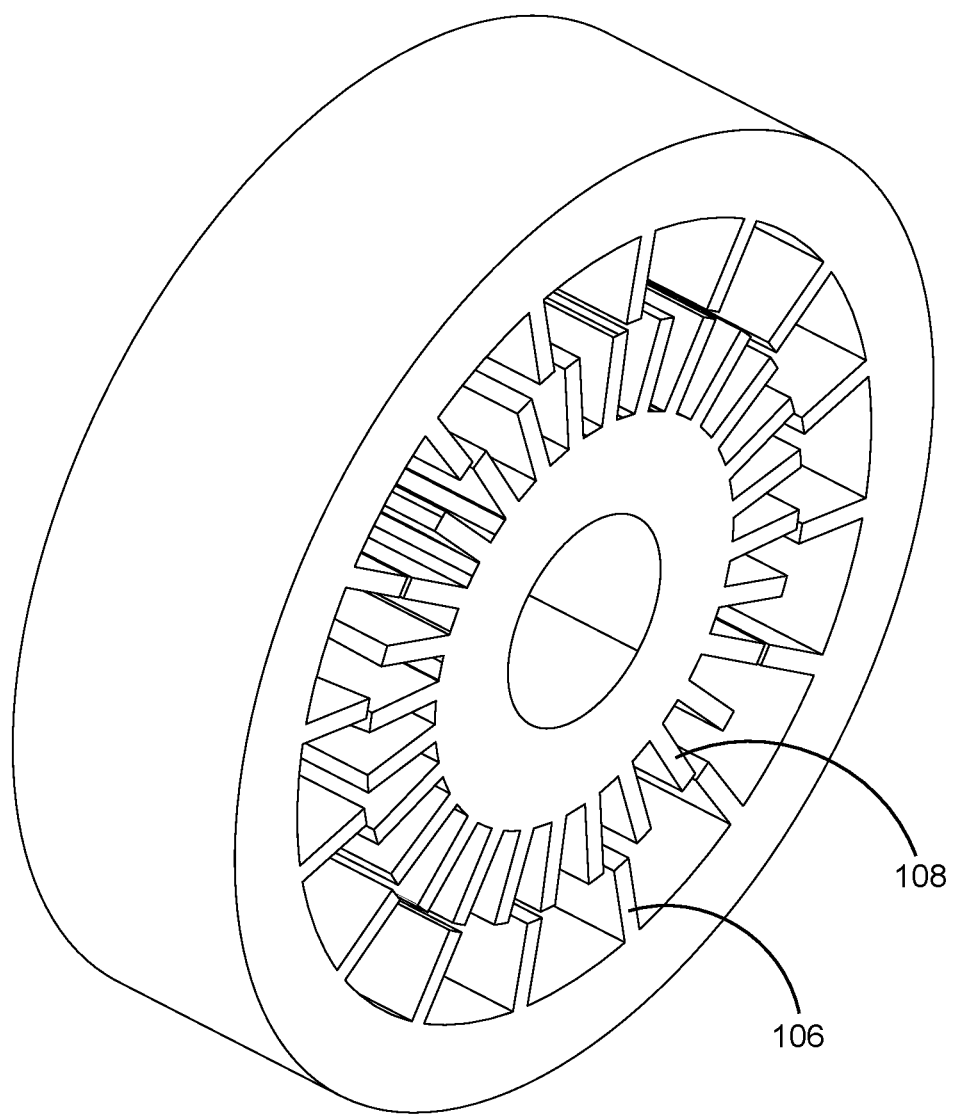
FIG. 3 is a 3-D view of the 16/28 SRM as an example of the proposed formulation.

FIG. 2 illustrates a 16/28 SRM as an example of the proposed formulation with 16 concentrated stator coil-stator poles 106 and 28 rotor poles 108. FIG. 3 illustrates a 3-D view of 16/28 SRM as an example of the proposed formulation showing rotor and stator with 16 concentrated stator coil-stator poles 106 and 28 rotor poles 108.

Figure 4A:
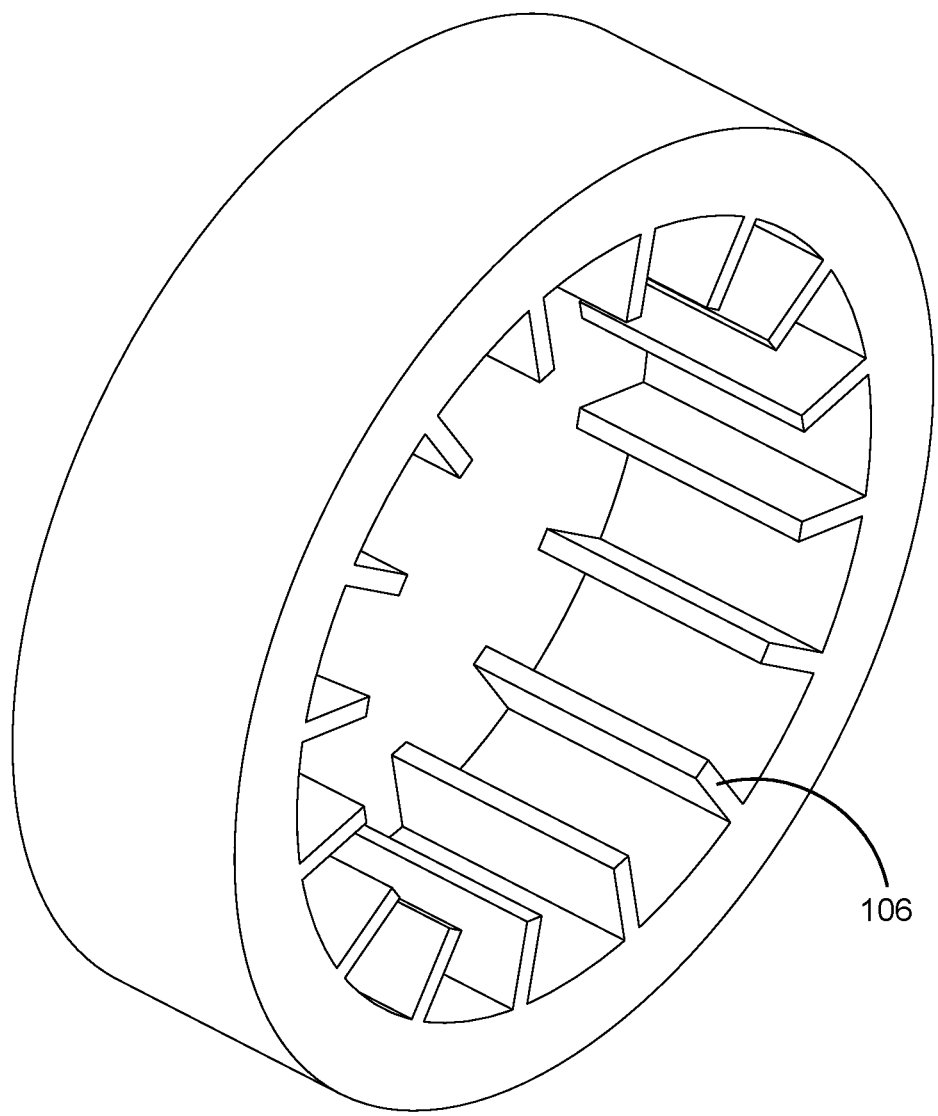
FIG. 4A illustrates 16 stator poles of the 16/28 SRM without coils and rotor assembly in accordance with the preferred embodiment of the present invention.
Figure 4B:
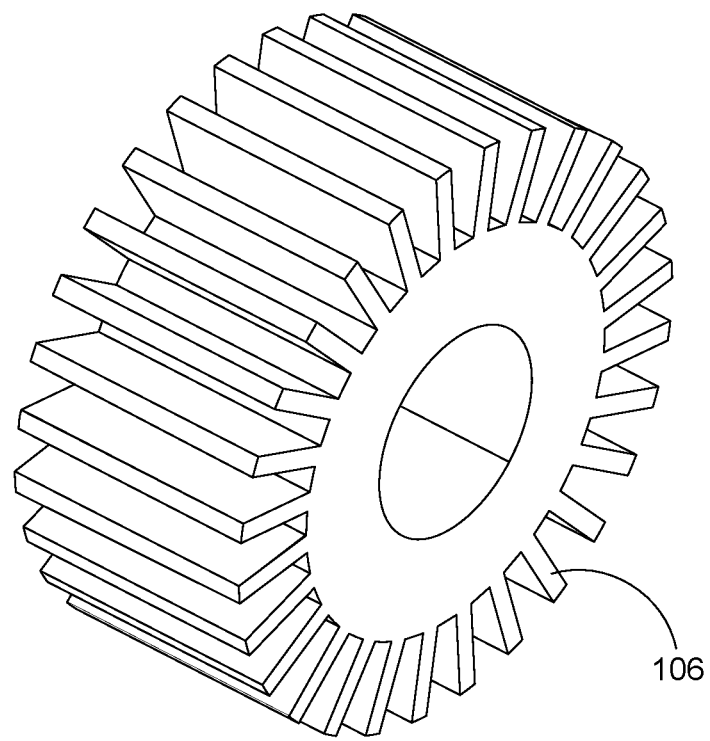
FIG. 4B illustrates 28 rotor poles for the 16/28 SRM without stator assembly in accordance with the preferred embodiment of the present invention.

FIG. 4A shows 16 stator poles 106 of the 16/28 SRM without coils and rotor assembly in accordance with the preferred embodiment of the present invention. FIG. 4B shows 28 rotor poles 108 for the 16/28 SRM without stator assembly in accordance with the preferred embodiment of the present invention.

Figure 5A:
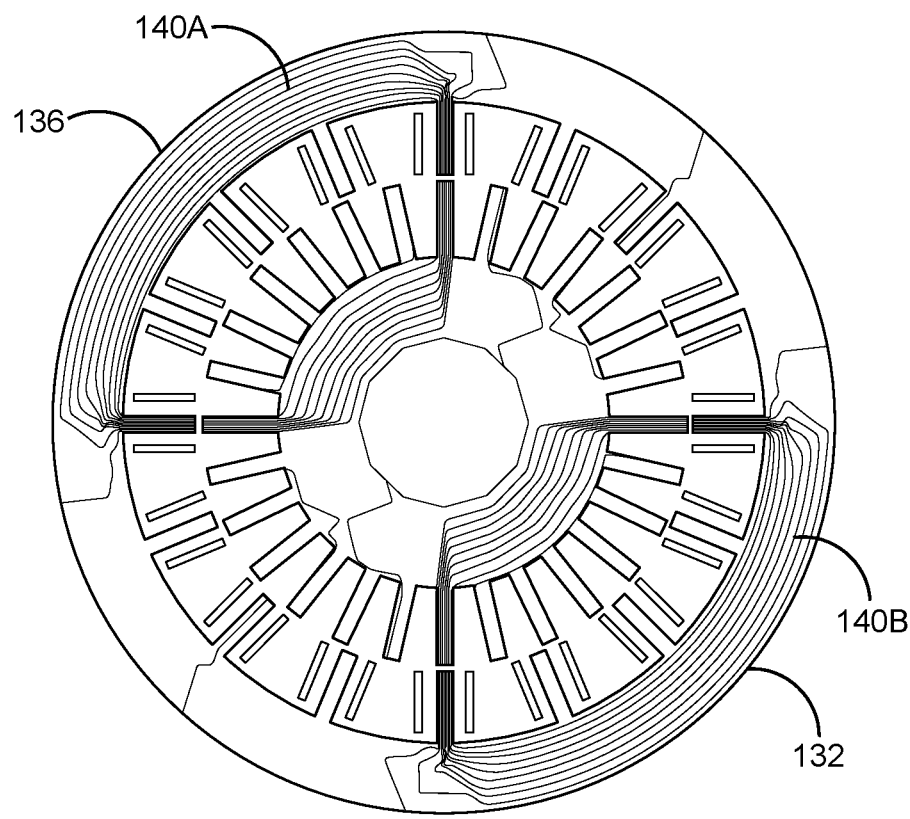
FIGS. 5A and 5B show the coil configuration in the 16/28 SRM that can be modified to allow four independent short-flux paths.
Figure 5B:
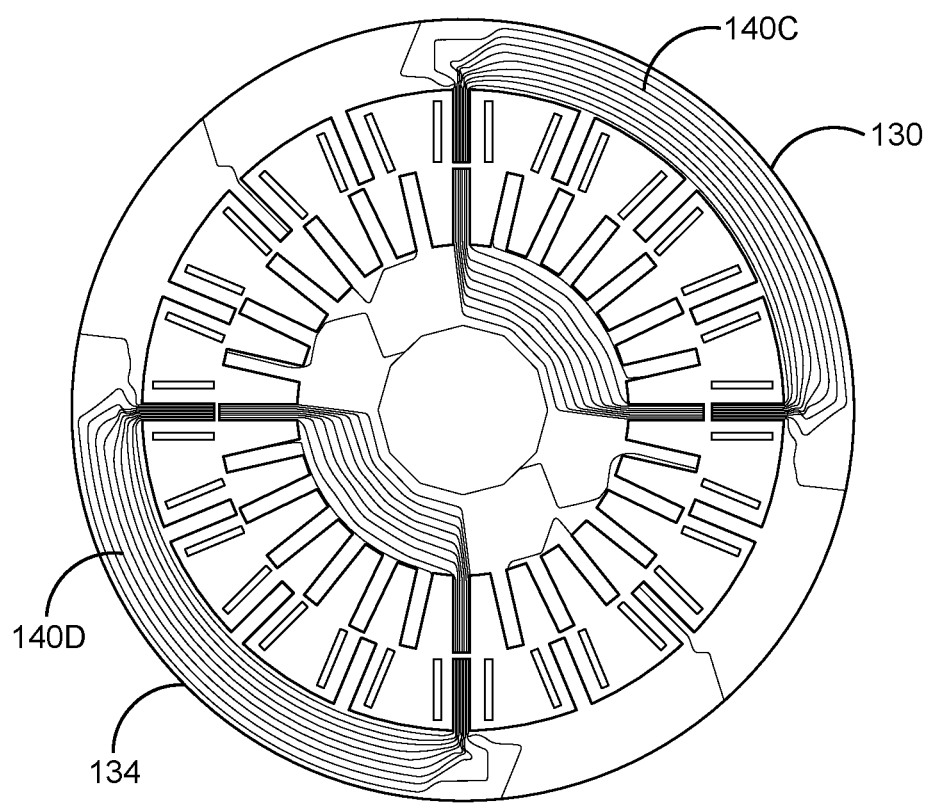
Figure 5C:
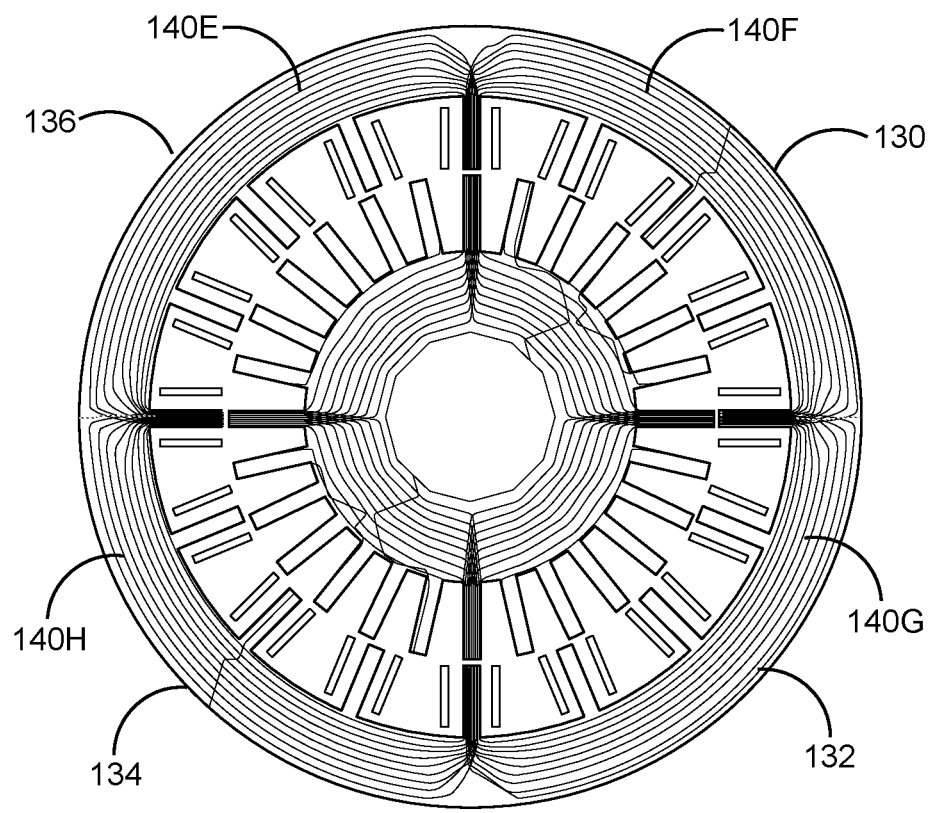
FIG. 5C shows a finite element analysis simulation of 16/28 SRM showing an alternate winding combination.

FIGS. 5A and 5B show the coil configuration in the 16/28 SRM that can be modified to allow four independent short-flux paths 140A-140D. FIG. 5A shows a finite element analysis simulation of 16/28 SRM showing two independent flux paths 140A and 140B, second quadrant 132 and fourth quadrant 136 in the machine. FIG. 5B shows a finite element analysis simulation of 16/28 SRM showing two other independent flux paths 140C and 140D, first quadrant 130 and third quadrant 134 in the machine. FIG. 5C shows a finite element analysis simulation of 16/28 SRM showing an alternate winding combination, also leading to four independent flux paths 140E, 140F, 140G and 140H in the machine. In yet another embodiment, the SRM is of the external-rotor internal-stator design.

Figure 6:
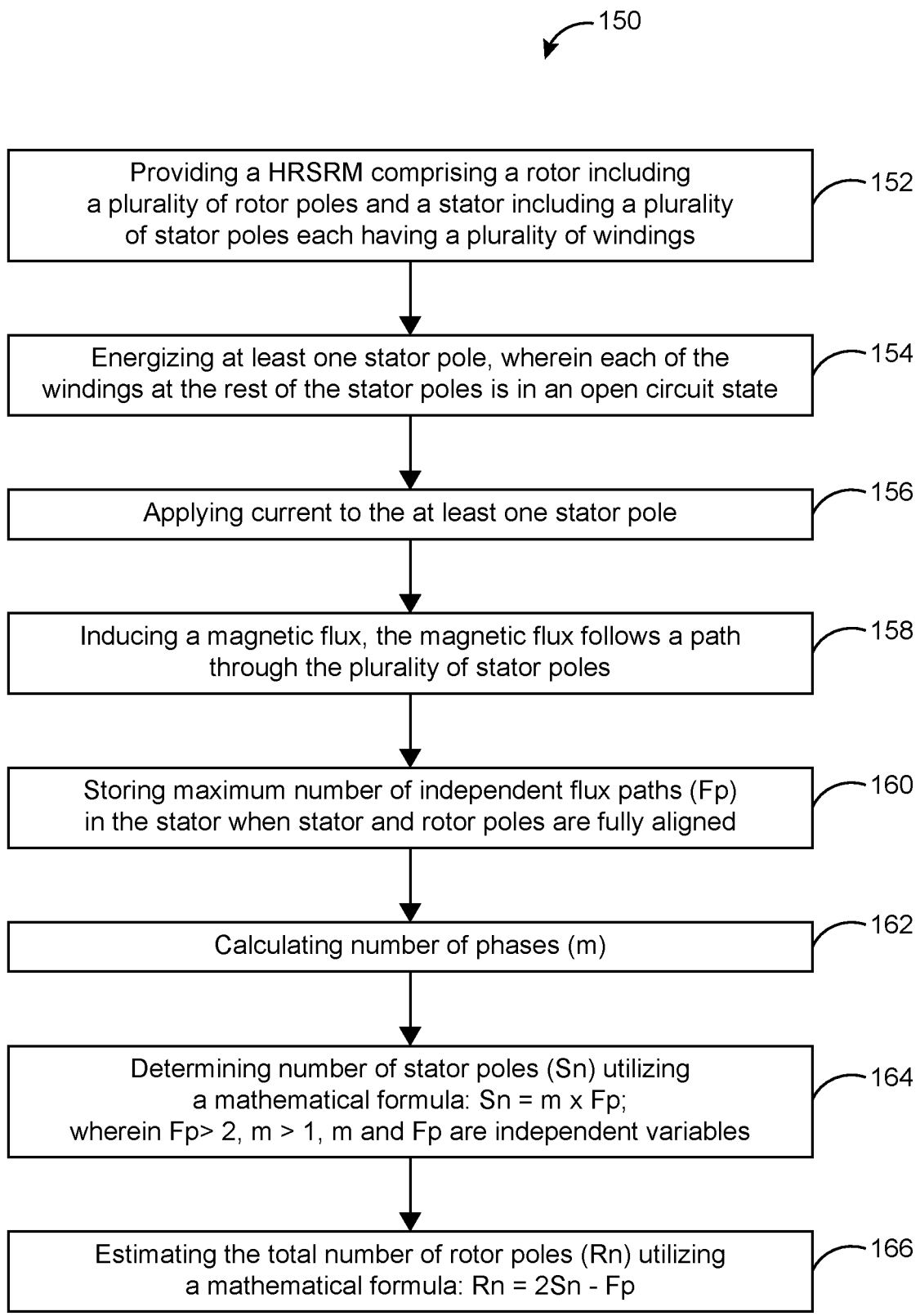
FIG. 6 is a flowchart that illustrates a method for estimating number of rotor poles for a high rotor pole switched reluctance machine (HRSRM).

As shown in FIG. 6, a method for estimating number of rotor poles for a high rotor pole switched reluctance machine (HRSRM) comprising a rotor including a plurality of rotor poles and a stator including a plurality of stator poles each having a plurality of windings is disclosed. A first step at FIG. 6 involves providing the HRSRM comprising a rotor including a plurality of rotor poles and a stator including a plurality of stator poles each having a plurality of windings as shown in block 152. Then, energizing at least one stator pole, wherein each of the windings of the remainder of the stator poles is in an open circuit state as illustrated in block 154. Current is applied to the at least one stator pole as illustrated in block 156. Next, inducing a magnetic flux, the magnetic flux follows a path through the plurality of stator poles as shown in block 158. Storing a maximum number of independent flux paths ($F_p$) in the stator when stator and rotor poles are fully aligned as illustrated in block 160. Then, calculating a number of phases (m) as illustrated in block 162. Finally, determining a number of stator poles ($S_n$) utilizing a mathematical formula, $S_n = m \times F_p$, wherein $F_p > 2$, $m > 1$, m and $F_p$ are independent variables is illustrated in block 164. Thus, estimating the number of rotor poles ($R_n$) utilizing a mathematical formula, $R_n = 2S_n - F_p$ is accomplished as illustrated in block 166.

The present invention relates to a switched reluctance machine (SRM) in which noise and vibration generated can be reduced through an improvement of the rotor pole/stator pole configuration. The improved configuration provides a higher rate of change of inductance with respect to rotor position, which can improve the torque quality of the machine. The system provides a switched reluctance machine having salient rotor poles and stator poles in a numerical relationship. The proposed formulation presents a mathematical formulation, with a specific number of stator and rotor poles for a chosen m and Fp, which provides improved noise performance and design flexibility. In one example, when m=4, a machine with four phases and Fp=4 a machine with four possible independent flux paths, a 16/28 SRM results.

TABLE 1

Table 1: Some, but not all viable combinations of stator poles and rotor poles using the proposed formulation with m = 4 are as follows:

| $F_p$ | Number of phases (m) 4 | |
|---|---|---|
|  | $S_n$ | $R_n$ |
| 3 | 12 | 21 |
| 4 | 16 | 28 |
| 5 | 20 | 35 |
| 6 | 24 | 42 |
| 7 | 28 | 49 |
| 8 | 32 | 56 |
| 9 | 36 | 63 |
| 10 | 40 | 70 |
| 11 | 44 | 77 |
| 12 | 48 | 84 |
| 13 | 52 | 91 |
| 14 | 56 | 98 |
| 15 | 60 | 105 |
| 16 | 64 | 112 |
| 17 | 68 | 119 |
| 18 | 72 | 126 |
| 19 | 76 | 133 |
| 20 | 80 | 140 |

The embodiment of this formulation can be described by several other viable combinations of stator poles and rotor poles. Utilizing the proposed formulation, it is possible to design machines with varying number of phases and stator/rotor configurations. The present invention provides an SRM with applications for both rotary or linear designs, and which comprises a relationship between the number of stator poles and rotor poles so as to provide an SRM with a minimal amount of torque ripple and acoustic noise while providing improved power density and torque production. In particular, the present invention provides an SRM having a salient rotor and stator pole numerical relationship of number of stator poles Sn, and number of rotor poles Rn, which can be expressed as $R_n=2S_n-F_p$, such as an $S_n/R_n$ pole count in a 16/28 configuration. The present invention provides an SRM, whether operated as a motor, generator, or both. The proposed topologies have the highest inductance when aligned and the lowest at unaligned positions, much like a conventional SRM. All conventional power electronic converters and control strategies adopted for conventional SRMs can be applied to the proposed SRM. The proposed SRM exhibits a smoother torque profile due to the higher number of strokes per revolution. This offers better peak and average torque profiles relative to conventional SRMs. The narrower stator pole facilitates a larger fill factor i.e. more windings, which considerably improves the winding resistance and the thermal limits of the phase windings.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An electrical machine comprising:
a stator including a plurality of stator poles; and
a rotor including a plurality of rotor poles;
wherein the plurality of rotor poles is in a numerical relationship with the plurality of stator poles and provides a plurality of combinations of the stator poles and rotor poles utilizing the numerical relationship defined by a mathematical formula:

$$R_n=2S_n-F_p;$$

such that $S_n=m \times F_p$, $F_p>2$, $m>1$ wherein $R_n$ is the number of rotor poles, $S_n$ is the number of stator poles, $F_p$ is the maximum number of independent flux paths in the stator when stator and rotor poles are fully aligned, and m is the number of phases, wherein the number of phases and the number of independent flux paths determines the plurality of combinations of the stator poles and rotor poles, wherein $F_p$ is even.

2. The electrical machine according to claim 1 wherein the mathematical formulation provides a specific number of stator and rotor poles for a chosen m and Fp.

3. The electrical machine according to claim 1 wherein the rotor is external to the stator.

4. The electrical machine according to claim 1 wherein each rotor pole constitutes a plurality of flux guides which serve to bend the flux in the stator pole around a periphery of the rotor pole.

5. The electrical machine of claim 1 wherein the machine is a linear generator.

6. The electrical machine of claim 1 wherein the machine is a linear motor.

7. The electrical machine of claim 1 wherein the machine is a rotary generator.

8. The electrical machine of claim 1 wherein the machine is a rotary motor.

9. An electrical machine comprising: a stator including a plurality of salient stator poles and a rotor including a plurality of salient rotor poles, the HRSRM electrical machine providing a plurality of combinations of the rotor poles and stator poles utilizing a numerical relationship defined by a mathematical formula:

$$R_n=2S_n-F_p;$$

such that $S_n=m \times F_p$, $F_p>2$, $m>1$ wherein $R_n$ is the number of rotor poles, $S_n$ is the number of stator poles, $F_p$ is the maximum number of independent flux paths in the stator when stator and rotor poles are fully aligned, and m is the number of phases, wherein the number of phases and the number of independent flux paths determines the plurality of combinations of the stator poles and rotor poles, wherein $F_p$ is even.

10. The electrical machine according to claim 9 further providing a high rate of change of inductance with respect to rotor position, which can improve torque quality of the machine.

11. The electrical machine according to claim 9 wherein the mathematical formulation provides a specific number of stator and rotor poles for a chosen m and Fp.

12. The electrical machine according to claim 9 wherein the rotor is external to the stator.

13. The electrical machine according to claim 9 wherein each rotor pole constitutes a plurality of flux guides which serve to bend the flux in the stator pole around a periphery of the rotor pole.

14. The electrical machine according to claim 9 wherein the stator poles facilitate a high fill factor.

15. The electrical machine of claim 9 wherein the machine is a linear generator.

16. The electrical machine of claim 9 wherein the machine is a linear motor.

17. The electrical machine of claim 9 wherein the machine is a rotary generator.

18. The electrical machine of claim 9 wherein the machine is a rotary motor.

19. A method for estimating number of rotor poles for an electrical machine comprising a rotor including a plurality of rotor poles and a stator including a plurality of stator poles each having a plurality of windings, and providing a plurality of combinations of the rotor poles and stator poles, the method comprising the steps of:
  (a) energizing at least one stator pole, wherein each of the windings of a remainder of stator poles is in an open circuit state;
  (b) applying current to the at least one stator pole;
  (c) inducing a magnetic flux, the magnetic flux following a path through the plurality of stator poles;
  (d) storing a maximum number of independent flux paths ($F_p$) in the stator when stator and rotor poles are fully aligned;
  (e) calculating a number of phases (m);
  (f) determining a number of stator poles (Se) utilizing a mathematical formula:

$$S_n = m \times F_p,$$

wherein $F_p > 2$, $m > 1$, $F_p$ is even, and the number of phases and the number of independent flux paths determines the plurality of combinations of the stator poles and rotor poles; and (g) estimating the number of rotor poles ($R_n$) utilizing a mathematical formula:

$$R_n = 2S_n - F_p.$$

20. The method of claim 19 providing a high rate of change of inductance with respect to rotor position.

21. The method of claim 19 wherein the mathematical formulation provides improved noise performance and design flexibility to the switched reluctance machine.

22. The method of claim 19 wherein the switched reluctance machine exhibits a smoothed torque profile due to a high number of strokes per revolution.

23. The method of claim 19 wherein the stator poles facilitate a high fill factor.

24. The method for estimating number of rotor poles according to claim 19 wherein the machine is a linear generator.

25. The method for estimating number of rotor poles according to claim 19 wherein the machine is a linear motor.

26. The method for estimating number of rotor poles according to claim 19 wherein the machine is a rotary generator.

27. The method for estimating number of rotor poles according to claim 19 wherein the machine is a rotary motor.

* * * * *